US012560815B2

(12) United States Patent
Wu et al.

(10) Patent No.: US 12,560,815 B2
(45) Date of Patent: Feb. 24, 2026

(54) NEAR-EYE DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Yulong Wu, Beijing (CN); Ke Li, Beijing (CN); Chenru Wang, Beijing (CN); Jiarong Bai, Beijing (CN); Na Han, Beijing (CN); Ruijun Dong, Beijing (CN); Lili Chen, Beijing (CN); Hao Zhang, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 545 days.

(21) Appl. No.: 17/927,763

(22) PCT Filed: Jul. 5, 2021

(86) PCT No.: PCT/CN2021/104508
§ 371 (c)(1),
(2) Date: Nov. 25, 2022

(87) PCT Pub. No.: WO2022/033233
PCT Pub. Date: Feb. 17, 2022

(65) Prior Publication Data
US 2023/0236422 A1     Jul. 27, 2023

(30) Foreign Application Priority Data
Aug. 13, 2020     (CN) ........................ 202010812083.X

(51) Int. Cl.
*G02B 27/01*     (2006.01)
*G02B 27/28*     (2006.01)

(52) U.S. Cl.
CPC ....... *G02B 27/0172* (2013.01); *G02B 27/283* (2013.01); *G02B 27/286* (2013.01); *G02B 2027/012* (2013.01); *G02B 2027/0178* (2013.01)

(58) Field of Classification Search
CPC .............. G02B 27/0172; G02B 27/283; G02B 27/286; G02B 2027/012; G02B 2027/0178
(Continued)

(56) References Cited

U.S. PATENT DOCUMENTS

| | | | |
|---|---|---|---|
| 2,748,659 A * | 6/1956 | Schroder .............. | G02B 27/283 |
| | | | 359/489.06 |
| 5,903,396 A | 5/1999 | Rallison | |

(Continued)

FOREIGN PATENT DOCUMENTS

| | | |
|---|---|---|
| CN | 108333779 A | 7/2018 |
| CN | 108681073 A | 10/2018 |

(Continued)

OTHER PUBLICATIONS

Wikipedia page "Lens" as of May 2018 (Year: 2018).*
(Continued)

*Primary Examiner* — George G. King
(74) *Attorney, Agent, or Firm* — HOUTTEMAN LAW LLC

(57) ABSTRACT
A near-eye display device, including: a display device (1) for displaying an image; an imaging lens (2) on a light-outgoing side of the display device (1) and for imaging the image displayed on the display device (1); a polarizer (3) on the light-outgoing side and for converting light emitted from the display device (1) into linearly polarized light; first and second phase delay layers (41, 42), on a side of the polarizer (3) distal to the display device (1) and for converting a polarization state of incident light; a polarized light splitter
(Continued)

(5) on a side of the second phase delay layer (42) distal to the polarizer (3); and a curved mirror (6) on a reflected light path of the polarized light splitter (5) and for partially reflecting light transmitted by the second phase delay layer (42) to human eyes and partially transmitting ambient light.

16 Claims, 5 Drawing Sheets

(58) Field of Classification Search
USPC ............................ 359/489.08, 629, 639, 640
See application file for complete search history.

(56) References Cited

U.S. PATENT DOCUMENTS

| | | | |
|---|---|---|---|
| 2018/0180889 A1 | 6/2018 | Lee et al. | |
| 2019/0025602 A1* | 1/2019 | Qin ........................ | G02B 30/36 |
| 2019/0033581 A1 | 1/2019 | Li et al. | |
| 2019/0219818 A1 | 7/2019 | Mattinson | |
| 2021/0208400 A1* | 7/2021 | Hong ................... | G02B 27/283 |

FOREIGN PATENT DOCUMENTS

| | | |
|---|---|---|
| CN | 207946601 U | 10/2018 |
| CN | 109613705 A | 4/2019 |
| CN | 110161687 A | 8/2019 |
| CN | 110161690 A | 8/2019 |
| CN | 110208948 A | 9/2019 |
| CN | 110515208 A | 11/2019 |
| CN | 209803457 U | 12/2019 |
| CN | 209842241 U | 12/2019 |
| CN | 111175981 A | 5/2020 |
| CN | 210776039 U | 6/2020 |
| GB | 707060 A | 4/1954 |
| JP | 03221917 A | 9/1991 |
| JP | H11237584 A | 8/1999 |
| KR | 20170095109 A | 8/2017 |
| KR | 101898056 B1 | 9/2018 |
| WO | WO2019154426 A1 | 8/2019 |
| WO | WO2019154429 A1 | 8/2019 |

OTHER PUBLICATIONS

Serway et al. "College Physics" p. 603, 1985 (Year: 1985).*
Edmund Optics webpage "Laser Beam Expanders" Sections 5.1-5.5 of the Laser Optics Resource Guide, as of 2020 (Year: 2020).*
China Patent Office, First Office Action dated Jun. 24, 2022, for corresponding Chinese application 202010812083.X.
China Patent Office, Second Office Action dated Nov. 23, 2022, for corresponding Chinese application 2 202010812083.X.

* cited by examiner

NEAR-EYE DISPLAY DEVICE

CROSS-REFERENCE TO RELATED APPLICATIONS

This is a National Phase Application filed under 35 U.S.C. 371 as a national stage of PCT/CN2021/104508 fled on Jul. 5 2021, an application claiming priority to Chinese patent application No. 202010812083.X, entitled "a near-eve display device" and filed in the Chinese patent office on Aug. 13, 2020, the entire content of each of which is incorporated herein by reference.

TECHNICAL FIELD

The present disclosure relates to the field of display technologies, and in particular, to a near-eye display device (which may also be referred to as a near-to-eye display device).

BACKGROUND

With the recent continuous development of Virtual Reality (VR) and Augmented Reality (AR) technologies, near-eye display products have been widely adopted in the civil fields such as films and television, education, medical care, and the like, from initial application in the military field.

A near-eye display optical system has the characteristics of small volume, light weight, capability of realizing three-dimensional display, and the like, and thus has promising development prospect. However, an existing near-eye display optical system adopts a plate glass coated with a transflective film (i.e., coated with a semi-transparent and semi-reflective film) to refract and reflect light, such that at least half energy of the light is lost when the light passes through the plate glass every time, resulting in a low light efficiency of the existing near-eye display optical system. In addition, the light reflected twice on upper and lower surfaces of the plate glass will cause a problem of ghosting (or double images), which deteriorates a visual effect.

SUMMARY

The present disclosure provides a near-eye display device, including:
    a display device configured to display an image;
    an imaging lens, positioned on a light outgoing side of the display device, and configured to image the image displayed on the display device;
    a polarizer, positioned on the light outgoing side of the display device, and configured to convert light emitted from the display device into first linearly polarized light;
    a first phase delay layer, positioned on a side of the polarizer distal to the display device, and configured to convert the first linearly polarized light transmitted by the polarizer into circularly polarized light;
    a polarized light splitter, positioned on a side of the first phase delay layer distal to the polarizer, obliquely arranged relative to the polarizer, and configured to transmit the first linearly polarized light and reflect a second linearly polarized light with a polarization direction perpendicular to a polarization direction of the first linearly polarized light;
    a second phase delay layer, positioned on a side of the polarized light splitter proximal to the first phase delay layer, and configured to convert the circularly polarized light transmitted by the first phase delay layer into the second linearly polarized light or partially polarized light including the second linearly polarized light, wherein the second linearly polarized light is reflected by the polarized light splitter, then passes through the second phase delay layer again, and is converted by the second phase delay layer into circularly polarized light or elliptically polarized light; and
    a curved mirror, positioned on a reflected light path of the polarized light splitter and on a side of the second phase delay layer distal to the polarized light splitter, and configured to partially reflect the circularly polarized light or the elliptically polarized light converted by the second phase delay layer again to a position of a human eye and partially transmit ambient light.

In some embodiments of the present disclosure, the first phase delay layer and the second phase delay layer are both quarter-wave plates; and
    optical axes of the quarter-wave plates are parallel to each other, and an angle between a polarization direction of the polarizer and the optical axis of each of the two quarter-wave plates is 45°.

In some embodiments of the present disclosure, the polarizer and the first phase delay layer are attached to each other.

In some embodiments of the present disclosure, the polarized light splitter includes:
    a substrate; and
    a polarized light splitting dielectric film positioned on a surface of the substrate.

In some embodiments of the present disclosure, the substrate is a flat plate, the polarized light splitting dielectric film is attached to a surface of the flat plate, and the second phase delay layer and the polarized light splitting dielectric film are attached to each other.

In some embodiments of the present disclosure, the near-eye display device further includes an antireflection film on a surface of the flat plate distal to the polarized light splitting dielectric film.

In some embodiments of the present disclosure, the substrate includes a first substrate part and a second substrate part, wherein the first substrate part is positioned on a side proximal to the polarizer, and the second substrate part is positioned on a side of the first substrate part distal to the polarizer;
    opposite surfaces of the first substrate part and the second substrate part are stepped surfaces, respectively, another surface, which is opposite to the stepped surface, of each of the first substrate part and the second substrate part is a flat surface, the stepped surfaces of the first substrate part and the second substrate part are engaged with each other, and flat surfaces of the first substrate part and the second substrate are parallel to each other; and
    the second phase delay layer is attached to the stepped surface of the first substrate part or the second substrate part, and the polarized light splitting dielectric film is attached to the flat surface of the second substrate part.

In some embodiments of the present disclosure, at least one of the flat surface of the first substrate part and the flat surface of the second substrate part is provided with an antireflection film.

In some embodiments of the present disclosure, the imaging lens includes at least one lens; and
    each of the at least one lens is one of a spherical lens, an aspheric lens, or a free-form surface lens.

In some embodiments of the present disclosure, a light outgoing surface of a lens, which is farthest from the display device, of the imaging lens is a flat surface, and the polarizer is attached to the light outgoing surface.

In some embodiments of the present disclosure, a material of each of the at least one lens is glass or plastic.

In some embodiments of the present disclosure, the polarizer is positioned between the display device and the imaging lens.

In some embodiments of the present disclosure, the display device is a liquid crystal display; and the polarizer is attached to a light outgoing surface of the liquid crystal display, and the polarizer also serves as a linear polarizer layer on a light outgoing side of the liquid crystal display.

In some embodiments of the present disclosure, the display device is an organic light emitting diode display or a micro organic light emitting diode display; and the polarizer is attached to a light outgoing surface of the display device, and also serves as a linear polarizer layer of a circular polarizer of the display device.

In some embodiments of the present disclosure, the display device is a light emitting diode display; and the polarizer is attached to a light outgoing surface of the light emitting diode display.

In some embodiments of the present disclosure, the curved mirror is one of a spherical mirror, an aspheric minor, or a free-form surface mirror.

In some embodiments of the present disclosure, a material of the curved minor is one of glass or plastic.

In some embodiments of the present disclosure, the near-eye display device further includes a transflective film on a surface of the curved mirror.

In some embodiments of the present disclosure, the near-eye display device is glasses or a helmet; and the curved minor also serves as lenses of the glasses or a lens of the helmet.

BRIEF DESCRIPTION OF THE DRAWINGS

In order to more clearly illustrate technical solutions of embodiments of the present disclosure, the drawings provided in the embodiments of the present disclosure will be briefly described below. It is obvious that the drawings described below are only some embodiments of the present disclosure, and other drawings may be obtained according to the provided drawings by one of ordinary skill in the art without creative efforts. In the drawings.

DETAILED DESCRIPTION OF EMBODIMENTS

Figure 1:
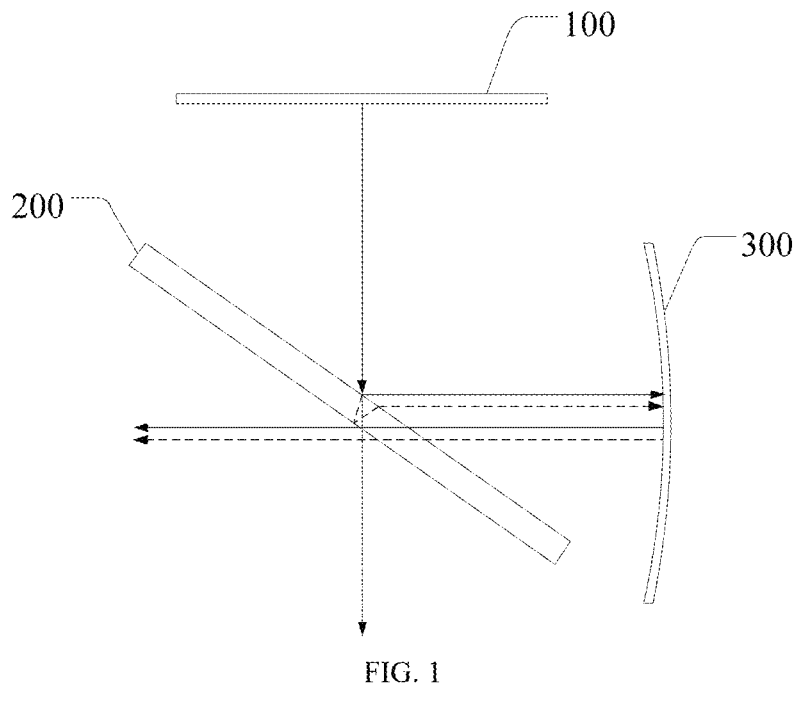
FIG. 1 is a schematic diagram showing a structure of a conventional near-eye display device.

In order to make the aforementioned objects, features and advantages of the present disclosure more comprehensible, the present disclosure will be further described below in conjunction with the accompanying drawings and examples. Exemplary embodiments may, however, be embodied in many different forms and should not be construed as limited to the forms set forth herein; rather, these forms are provided such that the present disclosure will be thorough and complete, and will fully convey the concept of exemplary embodiments to one of ordinary in the art. The same reference numerals in the drawings denote the same or similar structures, and thus, a repetitive description thereof will be omitted. The words used in this disclosure to convey positions and/or orientations are illustrated in the accompanying drawings as an example, but they may be changed as desired and those changes are considered to fall within the scope of the present disclosure. The drawings of the present disclosure are for illustrating a relative positional relationship only, but do not necessarily represent an actual proportional relationship.

A near-eye display device refers to a display device worn on the eyes of a user, for example, the near-eye display device is usually in the form of glasses or a helmet. The near-eye display device may provide AR and VR experiences for the user. In the AR near-eye display technology, a virtual image generated by the near-eye display device is superimposed on a real image of the real world, such that the user can see a final enhanced real image from a screen. In the VR near-eye display technology, a left-eye image and a right-eye image are displayed on near-eye displays corresponding to the left and right eyes, respectively, and the left and right eyes can synthesize stereoscopic vision in the brain after respectively acquiring the left-eye image and the right-eye image with different information.

FIG. 1 is a schematic diagram showing a structure of a conventional near-eye display device.

Referring to FIG. 1, an optical system of the conventional near-eye display device adopts a plate glass 200 coated with a transflective film (i.e., coated with a semi-transparent and semi-reflective film) to refract and reflect light from an image source 100, and at least half of energy of the light is lost when the light passes through the plate glass 200 each time, which results in a low light efficiency of the optical system. In addition, the light is reflected twice on the upper and lower surfaces of the plate glass, such that two light beams reflected by a reflector 300 cause the problem of ghosting, which deteriorates the visual effect.

Figure 2:
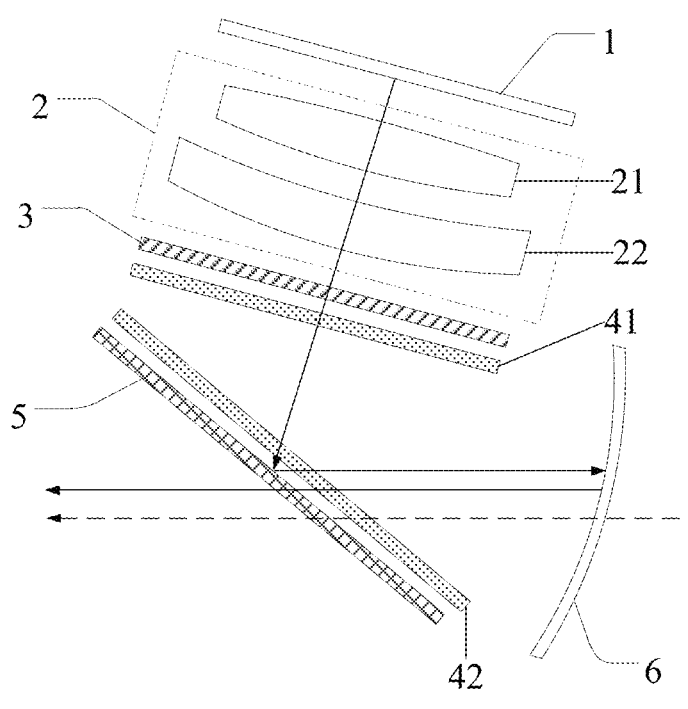
FIG. 2 is a first schematic diagram showing a structure of a near-eye display device according to an embodiment of the present disclosure.

FIG. 2 is a first schematic diagram showing a structure of a near-eye display device according to an embodiment of the present disclosure.

Referring to FIG. 2, the near-eye display device provided by the present embodiment includes: a display device 1, an imaging lens 2, a polarizer 3, a first phase delay layer (or first phase retardation layer) 41, a second phase delay layer (or second phase retardation layer) 42, a polarized light splitter 5, and a curved mirror 6.

The display device 1 may display an image.

The display device 1 serves as an image source for displaying images. The near-eye display device may include one display device 1, a left-eye image and a right-eye image may be superimposed on the display device 1, eyes of a user watch the left-eye image and right-eye image and then observe a certain parallax therebetween, such that the user can feel a stereoscopic display effect. Alternatively, the near-eye display device may include two display devices 1 for displaying a left-eye image and a right-eye image, respectively, and then imaging systems mutually independent to each other may image the images displayed on the two display devices 1, such that the eyes of the user watch the left-eye image and right-eye image and then observe a certain parallax therebetween, and then the user can feel a stereoscopic display effect.

The display device 1 in the near-eye display device generally has a small size, and a display device with a high resolution may be adopted to display more image details, so as to provide a fine displayed image.

The display device 1 may be one of a liquid crystal display, a light emitting diode display, or an organic light emitting diode display, but the present disclosure is not limited thereto.

The liquid crystal display (LCD) mainly includes a backlight assembly and a liquid crystal display panel. The liquid crystal display panel itself does not emit light, and must realize brightness display relying on light provided by the backlight assembly. The display principle of the liquid crystal display is that liquid crystal is placed between two conductive glass plates, and an electric field generated between the two conductive glass plates drives liquid crystal molecules to rotate, to control transmission or blocking of the light from the backlight assembly, thereby displaying an image. If a color filter is further added to the liquid crystal display, a color image can be displayed. The technology of the liquid crystal display is mature, and the liquid crystal display has lower cost and excellent performance.

The light emitting diode (LED) display is a display device formed by an array of LEDs, in which LEDs are used as display sub-pixels, and display brightnesses of the LEDs are controlled to realize image display. The LED display has the characteristics of high brightness, low power consumption, low voltage requirement, being small and portable, and the like. The LED display serves as the display device 1 of the near-eye display device, which is beneficial to realizing the miniaturization of the near-eye display device.

The organic light emitting diode (OLED) display may also be referred to as an organic electroluminescent display or an organic light emitting semiconductor display. The OLED display is an electric current type organic light emitting device, emits light by injection and recombination of carriers, and an intensity of emitted light is in direct proportion to an injected current. In the OLED display, under the effect of an electric field, holes generated by an anode and electrons generated by a cathode move and are respectively injected into a hole transport layer and an electron transport layer, and then migrate to a light emitting layer. When the holes and the electrons recombine in the light emitting layer, energy excitons are generated to finally excite light emitting molecules to emit visible light. The OLED display is a self-luminous display device, and thus a backlight assembly is not required. As such, the whole OLED display has a small thickness, which is advantageous to the miniaturization of the near-eye display device and the installation of an entire product.

Light emitting units of an organic light emitting diode are miniaturized in the micro organic light emitting diode display, such that more pixels can be arranged in a limited space, and as a result a resolution of the display device can be improved.

The imaging lens 2 is positioned on a light outgoing side of the display device 1 for imaging an image displayed on the display device 1.

The display device 1 of the near-eye display device has a relatively small size, and the image displayed on the display device 1 cannot be directly watched by human eyes. As such, the imaging lens 2 is arranged on the light outgoing side of the display device 1, to amplify the image displayed on the display device 1 for imaging, so that the human eyes can observe the image.

In an embodiment of the present disclosure, the imaging lens 2 includes at least one lens. Taking the near-eye display device shown in FIG. 2 as an example, the imaging lens 2 in the present embodiment includes a first lens 21 and a second lens 22. The first lens 21 is located on the light outgoing side of the display device 1, and the second lens 22 is located on a side of the first lens 21 distal to (or away from) the display device 1. Further, the first lens 21 may be a positive lens (i.e., a convex lens), and the second lens 22 may be a negative lens (i.e., a concave lens).

In a specific implementation, the imaging lens 2 may alternatively adopt only one lens to simplify the structure, or alternatively may adopt three or more lenses to optimize the imaging quality. Embodiments of the present disclosure are described by taking an example in which the imaging lens 2 includes two lenses. However, the number of lenses included in the imaging lens 2 is not limited thereto. A type of each lens in the imaging lens 2 may be designed according to actual conditions, and is not limited herein.

Each lens in the imaging lens 2 may be a spherical lens, an aspheric lens, or a free-form surface lens. The spherical lens has the advantages of simple design, low requirement on assembly precision, and the like. The aspheric lens and the free-form surface lens each have a relatively small thickness, and can optimize the imaging quality. The spherical lens, the aspheric lens, and free-form surface lens may be selected according to actual requirements during optical design.

A material of each lens in the imaging lens 2 may be one of glass and plastic, but the present disclosure is not limited thereto.

The near-eye display device provided by the present embodiment further includes: the polarizer 3 positioned on the light outgoing side of the display device; the first phase delay layer 41 positioned on a side of the polarizer 3 distal to the display device 1; the polarized light splitter 5 positioned on a side of the first adjacent delay layer 41 distal to the polarizer 3; the second phase delay layer 42 located on a side of the polarized light splitter 5 proximal to the first phase delay layer 41 and rotates obliquely with respect to the polarizer 3; and the curved mirror 6 positioned on a reflected light path of the polarized light splitter 5 and on a side of the second phase delay layer 42 distal to the polarized light splitter 5.

The polarizer 3 may convert the light output from the display device 1 into first linearly polarized light. The first phase delay layer 41 may convert the first linearly polarized light transmitted by the polarizer 3 into circularly polarized light. The second phase delay layer 42 may convert the circularly polarized light transmitted by the first phase delay layer 41 into second linearly polarized light with a polarization direction perpendicular to a polarization direction of the first linearly polarized light. The polarized light splitter 5 may transmit the first linearly polarized light and reflect the second linearly polarized light, the second linearly polarized light is reflected by the polarized light splitter 5 and then is transmitted by the second phase delay layer 42, and is converted into circularly polarized light or elliptically polarized light by the second phase delay layer 42. The curved mirror 6 may partially reflect the circularly or elliptically polarized light, which is again transmitted through the second phase delay layer 42, toward a position where the human eye(s) is (are) located, and the curved mirror 6 may partially transmit ambient light.

Specifically, the near-eye display device provided by the present embodiment is an optical system capable of refracting and reflecting (i.e., deflecting) light, such that a volume of the near-eye display device can be decreased as a whole. The polarized light splitter 5 is an element for optical refraction and reflection (e.g., an element having a deflection function), and the polarized light splitter 5 has the properties of transmitting p-type polarized light and reflecting s-type polarized light. In the present disclosure, with the above-mentioned properties of the polarized light splitter 5, the light output from the display device 1 is completely reflected upon being incident on the polarized light splitter 5, and the light reflected from the curved mirror 6 is completely transmitted by the polarized light splitter 5. As such, an energy loss of the light output from the display device 1 can be greatly reduced.

In order to achieve the above purpose, in an embodiment of the present disclosure, the polarizer 3 is disposed on the light outgoing side of the display device 1, to convert the light emitted from the display device 1 into the first linearly polarized light with a certain polarization direction. For example, the polarizer 3 converts the light emitted from the display device 1 into the p-type polarized light. After passing through the first phase delay layer 41, the first linearly polarized light is converted into circularly polarized light; and after passing through the second phase delay layer 42, the circularly polarized light is converted into the second linearly polarized light or partially polarized light including the second linearly polarized light, with the polarization direction of the first linearly polarized light being rotated by 90°, that is, with the p-type polarized light being converted or partially converted into the s-type polarized light. When being incident on the polarized light splitter 5, the second linearly polarized light or the partially linearly polarized light may be completely reflected by the polarized light splitter 5 or a part of the second linearly polarized light or the partially linearly polarized light with a polarization direction parallel to an optical axis of the polarized light splitter 5 is reflected, and the reflected light is the s-type polarized light. The reflected light passes through the second phase delay layer 42 again to be incident on the curved mirror 6, and the second linearly polarized light is converted into the circularly polarized light or the elliptically polarized light again. After being reflected by the curved mirror 6, a rotation direction of the circularly polarized light or the elliptically polarized light is changed, and the reflected light passes through the second phase delay layer 42 again to be incident on the polarized light splitter 5. At this time, the polarization direction of the light after passing through the second phase delay layer 42 twice is rotated by 90° again, such that the circularly polarized light or the elliptically polarized light is converted into the first linearly polarized light (i.e., the s-type polarized light is converted into the p-type polarized light) or partially polarized light. Upon being incident on the polarized light splitter 5, the first linearly polarized light (i.e., the p-type polarized light) or the partially polarized light may be completely transmitted by the polarized light splitter 5 or a part of the second linearly polarized light or the partially linearly polarized light with a polarization direction parallel to the optical axis of the polarized light splitter 5 is transmitted by the polarized light splitter 5, to emit toward the position of the human eyes. As such, after a plurality of changes in the polarization state of the light emitted from the display device 1, the light emitted from the display device 1 can be used for image display, and has a high light efficiency.

The polarized light splitter 5 adopted by the present embodiment may completely reflect the light emitted from the display device 1 or may transmit a small part of the light emitted from the display device 1, such that when a user watches an image displayed on the near-eye display device 1 under the near-eye display device, the image displayed on the near-eye display device 1 can be weaken to improve the effect of protection privacy.

Meanwhile, the polarized light splitter 5 is adopted to replace the plate glass commonly used in the conventional near-eye display device, thereby avoiding the problem of ghosting (or double images) generated when the light is reflected on each of two surfaces of the plate glass.

Figure 3:
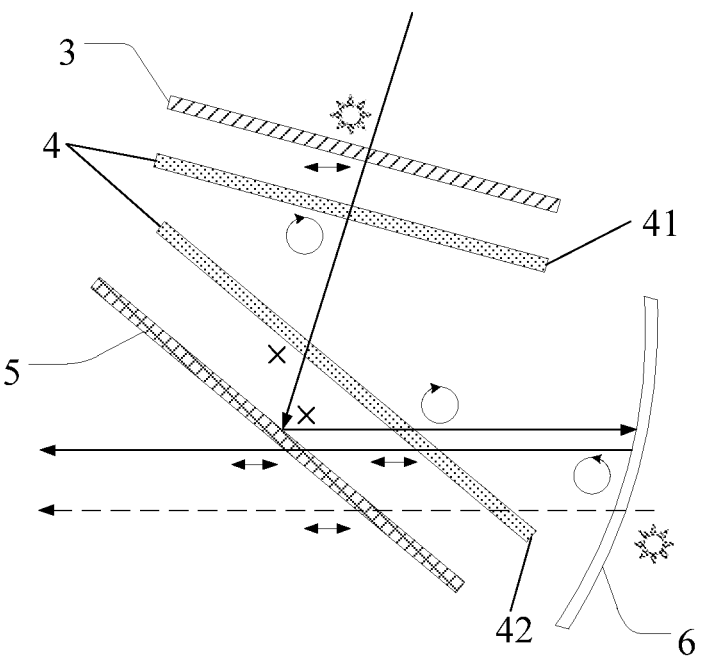
FIG. 3 is a schematic diagram illustrating the principle of conversion between polarization states of light in a near-eye display device according to an embodiment of the present disclosure.

FIG. 3 is a schematic diagram illustrating the principle of conversion between the light polarization states of a near-eye display device according to the present embodiment.

Referring to FIG. 3, after passing through the polarizer 3, the light emitted from the display device 1 firstly passes through the first phase delay layer 41, then passes through the second phase delay layer 42, and then is incident on the polarized light splitter 5. The light reflected by the polarized light splitter 5 firstly passes through the second phase delay layer 42 and then is incident on the curved mirror 6. After the light is reflected by the curved mirror 6, the reflected light passes through the second phase delay layer 42, is incident on the polarized light splitter 5, and finally is completely transmitted, by the polarized light splitter 5, to the position of the human eye(s).

The ambient light is incident on the curved mirror 6, transmitted by the curved mirror 6, passes through the second phase delay layer 42 and the polarized light splitter 5, and is transmitted to the position of the human eye(s).

If the light emitted from the display device 1 is natural light, the natural light is converted into the first linearly polarized light (i.e., the p-type polarized light) after passing through the polarizer 3; and after passing through the first phase delay layer 41, the first linearly polarized light transmitted from the polarizer 3 is converted by the first phase delay layer 41 into circularly polarized light (e.g., the right-handed circularly polarized light). After passing through the second phase delay layer 42, the circularly polarized light transmitted from the first phase delay layer 41 is converted by the second phase delay layer 42 into the second linearly polarized light or partially polarized light including the second linearly polarized light, and at this time, the polarization direction of the converted second linearly polarized light is rotated by 90°(to become the s-type polarized light) relative to the polarization direction of the first linearly polarized light. The second linearly polarized light may be completely reflected by the polarized light splitter 5 upon being incident on the polarized light splitter 5. The second linearly polarized light reflected from the polarized light splitter 5 passes through the second phase delay layer 42, and is converted by the second phase delay layer 42 into circularly polarized light (e.g., the right-handed circularly polarized light). If the second linearly polarized light is incident on the second phase delay layer 42 at a certain incident angle, the second linearly polarized light may be converted into the elliptically polarized light (e.g., the right-handed elliptically polarized light) by the second phase delay layer 42. The circularly polarized light or elliptically polarized light is incident on the curved mirror 6 and is reflected by the curved mirror 6, and after the reflection, the rotation direction of the circularly polarized light or elliptically polarized light is reversed (e.g., to become left-handed circularly polarized light or left-handed elliptically polarized light). Upon being incident on the second phase delay layer 42, the circularly polarized light or elliptically polarized light with the reversed rotation direction, which is reflected from the curved mirror 6, is converted by the second phase delay layer 42 into the circularly polarized light, and at this time the polarization direction of the linearly polarized light is rotated by 90° again to become the first linearly polarized light (i.e., the p-type polarized light). Upon being incident on the polarized light splitter 5, the first linearly polarized light may be completely transmitted by the polarized light splitter 5, and the transmitted light is emitted to the position where the human eyes are located.

The ambient light is natural light. The natural light is still natural light after passing through the curved mirror 6, and is still natural light after passing through the second phase delay layer 42. Finally, the ambient light is converted into linearly polarized light (i.e., the p-type polarized light) after passing through the polarized light splitter 5, and is incident on the position where the human eyes are located.

In an embodiment of the present disclosure, the first phase delay layer 41 and the second phase delay layer 42 may be quarter-wave plates, respectively, and optical axes of the two quarter-wave plates are parallel to each other. An angle between the polarization direction of the polarizer 3 and the optical axis of each of the quarter-wave plates is 45°.

In a practical application, each of the first phase delay layer 41 and the second phase delay layer 42 may be made of another material having a birefringence effect, such as liquid crystal, but is not limited herein.

Figure 4:
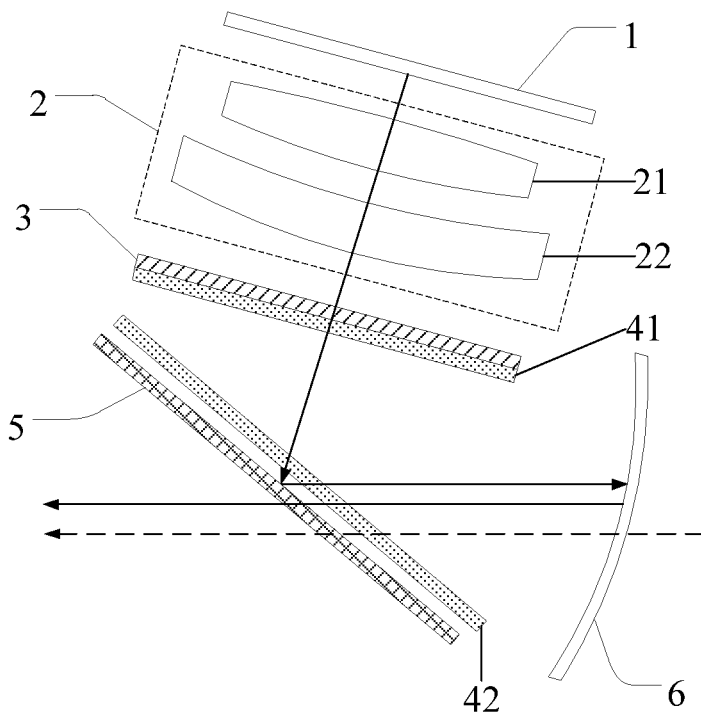
FIG. 4 is a second schematic diagram showing a structure of a near-eye display device according to an embodiment of the present disclosure.

FIG. 4 is a second schematic diagram showing a structure of a near-eye display device according to an embodiment of the present disclosure.

Referring to FIG. 4, the first phase delay layer 41 may be a quarter-wave plate, the quarter-wave plate and the polarizer 3 each have a relatively small thickness, and thus usually require the support of a substrate. Thus, in the present embodiment, the polarizer 3 and the first phase delay layer 41 may be attached to each other to support each other. The combination of the polarizer 3 and the first delay layer 41 with each other may omit at least one substrate.

Figure 5:
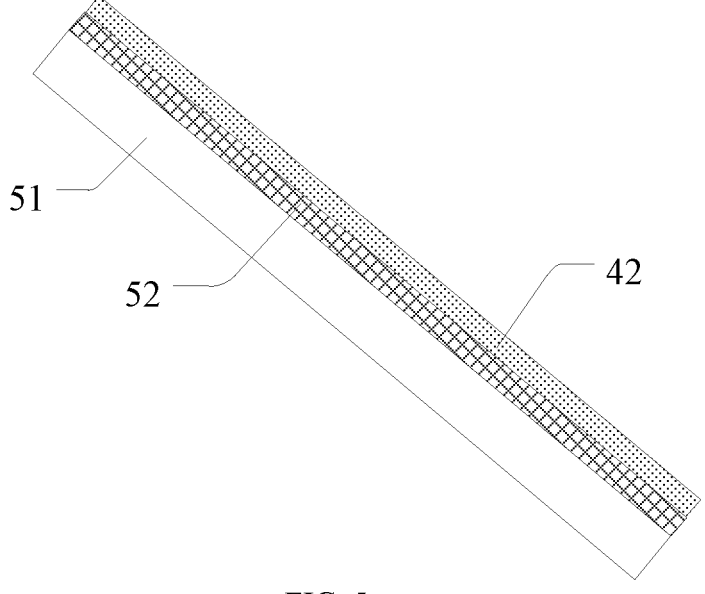
FIG. 5 is a first schematic diagram showing a structure of a polarized light splitter (which may also be referred to as a polarized beam splitter) according to an embodiment of the present disclosure.
Figure 6:
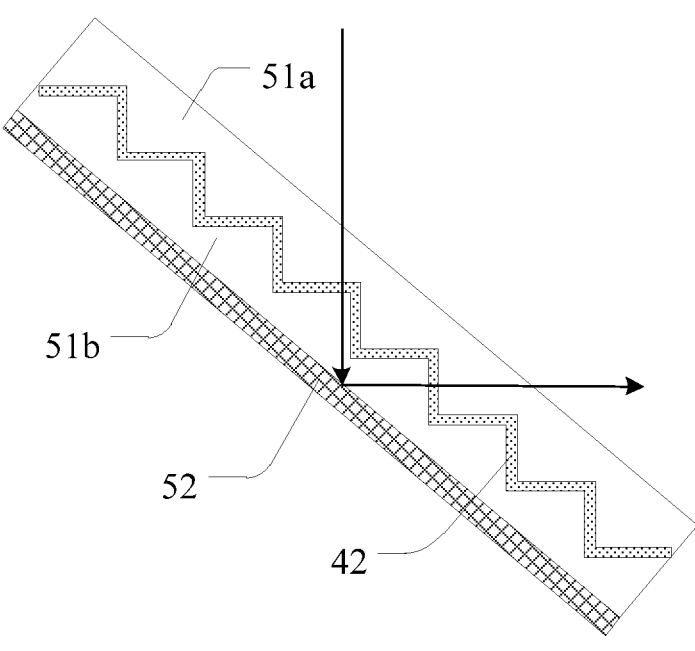
FIG. 6 is a second schematic diagram showing a structure of a polarized light splitter according to an embodiment of the present disclosure.

FIG. 5 is a first schematic diagram showing a structure of a polarized light splitter according to an embodiment of the present disclosure, and FIG. 6 is a second schematic diagram showing a structure of a polarized light splitter according to an embodiment of the present disclosure.

Referring to FIG. 5 and FIG. 6, the polarized light splitter includes a substrate 51 and a polarized light splitting dielectric film 52.

The polarized light splitting dielectric film 52 is usually a flexible film, which is required to be supported by a substrate. The substrate 51 has supporting and carrying functions. A surface of the substrate 51 is a flat surface (i.e., a plane) for attaching the polarized light splitting dielectric film 52 onto the surface of the substrate 51.

In some embodiments of the present disclosure, referring to FIG. 5, the substrate 51 is a flat plate, and a material of the flat plate may be a hard transparent material such as glass or plastic. Two opposite surfaces of the flat plate are parallel to each other. The polarized light splitting dielectric film 52 is attached to one of the surfaces of the flat plate, and then the second phase delay layer 42 and the polarized light splitting dielectric film 52 are attached to each other, so that the flat plate can support the polarized light splitting dielectric film 52 and the second phase delay layer 42. The second phase delay layer 42 may be a quarter-wave plate, and after being attached to the flat plate, the polarized light splitting dielectric film 52 has a flat surface, which is beneficial for attaching the quarter-wave plate onto the flat surface.

The flat plate serving as the substrate 51 is located near the human eyes. After passing through the polarizer 3, the first phase delay layer 41, the second phase delay layer 42 and the polarized light splitting dielectric film 52 as well as being incident on the curved mirror 6, the light emitted from the display device 1 is reflected by the curved mirror 6, and finally passes through the polarized light splitter 5 to arrive at the position where the human eyes are positioned. After irradiating on the curved mirror 6, the ambient light also finally passes through the polarized light splitter 5 to arrive at the position where the human eyes are positioned. In an embodiment of the present disclosure, an antireflection film is formed on a surface of the parallel plate distal to the polarized light splitting dielectric film 52, which is beneficial to the transmission of imaging light and the ambient light.

In another embodiment of the present disclosure, referring to FIG. 6, the substrate includes a first substrate part 51*a* and a second substrate part 51*b*. The first substrate part 51*a* is located on a side proximal to the polarizer 3, and the second substrate part 51*b* is located on a side of the first substrate part 51*a* distal to the polarizer 3.

Referring to FIG. 6, the opposite surfaces of the first substrate part 51*a* and the second substrate part 51*b* are stepped surfaces, respectively, and another surface, which is opposite to the stepped surface, of each of the first substrate part 51*a* and the second substrate part 51*b* is a flat surface (i.e., a planar surface). Further, the stepped surfaces of the first substrate part 51*a* and the second substrate part 51*b* may be engaged (or matched) with each other, and the flat surfaces of the first substrate part 51*a* and second substrate 51*a* that have been engaged with each other are parallel to each other.

In the present embodiment, the substrate has a structure as shown in FIG. 6. The second phase delay layer 42 may be attached to the stepped surface of the first substrate part 51*a* or the second substrate part 51*b*, and after the second phase delay layer 42 is attached to the stepped surface, the first substrate part 51*a* and the second substrate part 51*b* are combined together. Then, the polarized light splitting dielectric film 52 may be attached to the flat surface of the second substrate part 51*b*.

Each of the first substrate part 51*a* and the second substrate part 51*b* is made of the hard transparent material, and the second phase delay layer 42 may be a quarter-wave plate. By attaching the second phase delay layer 42 to the stepped surface of the first substrate part 51*a* or the second substrate part 51*b*, the second phase delay layer 42 can be supported and protected.

Referring to FIG. 6, the second phase delay layer 42 is formed on the stepped surface of the substrate, so that light is substantially kept in a normal incidence state (or vertical incidence state) upon being incident on the second phase delay layer 42, thereby improving the efficiency of converting the linearly polarized light into the circularly polarized light and thus the utilization efficiency of the light.

The outer side surfaces of the first substrate part 51*a* and the second substrate part 51*b* are parallel planes/flat surfaces. In an embodiment of the present disclosure, the second phase delay layer 42 needs to be disposed on a side proximal to the polarizer 3, and the polarized light splitting dielectric film 52 is attached to the outer surface of the second substrate part 51*b*, such that the second substrate part 51*b* can support the polarized light splitting dielectric film 52. In addition, the first substrate part 51*a* and the second substrate part 51*b* may transmit incident light, and an antireflection film may be formed on the outer side flat surface of the first substrate part 51*a* and/or an antireflection film may be formed on the flat surface of the second substrate part 51*b* to facilitate transmission of the imaging light and the ambient light.

Figure 7:
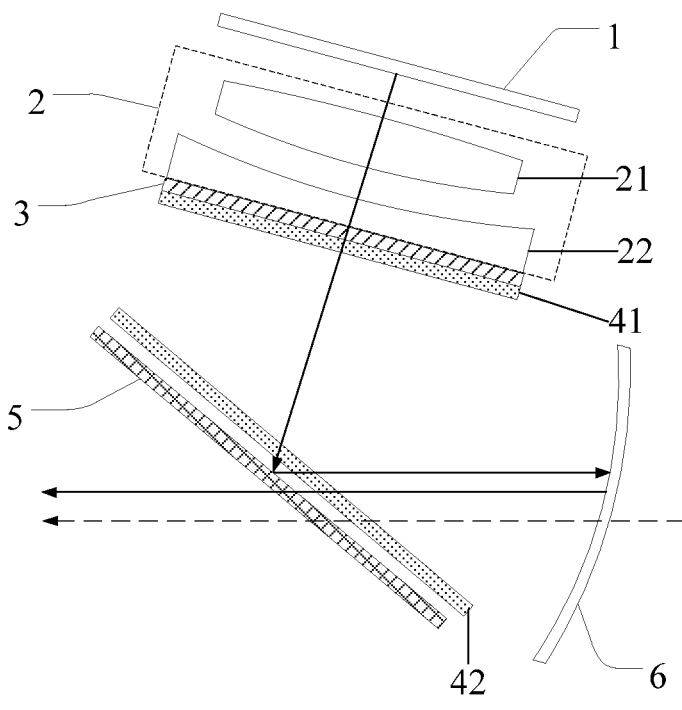
FIG. 7 is a third schematic diagram showing a structure of a near-eye display device according to an embodiment of the present disclosure.

FIG. 7 is a third schematic diagram showing a structure of a near-eye display device according to an embodiment of the present disclosure.

Referring to FIG. 7, in the present embodiment, a light outgoing surface of a lens, which is farthest from the display device 1, of the imaging lens 2 may be a flat surface, such that the polarizer 3 may be directly attached to the light outgoing surface of the lens.

The polarizer 3 usually needs to be supported by a substrate, and if a surface of the lens, which is on the light outgoing side, of the imaging lens 2 is designed to be a flat surface when the imaging lens 2 is designed, the polarizer 3 may be directly attached to the flat surface, which is the light emitting surface, of the lens, such that the substrate is omitted, and the structure of the near-eye display device is more compact.

Taking the near-eye display device shown in FIG. 7 as an example, the imaging lens 2 may include the first lens 21 and the second lens 22, and the second lens 22 is a lens of the imaging lens 2 farthest from the display device 1. The light outgoing surface of the second lens 22 may be designed to be a flat surface, such that the polarizer 3 may be directly attached to the light outgoing surface of the second lens 22. Meanwhile, the polarizer 3 and the first phase delay layer 41 may be attached to each other, and in this case, the composite structure of the polarizer 3 and the first phase delay layer 41 may be attached to the light outgoing surface of the second lens 22.

Figure 8:
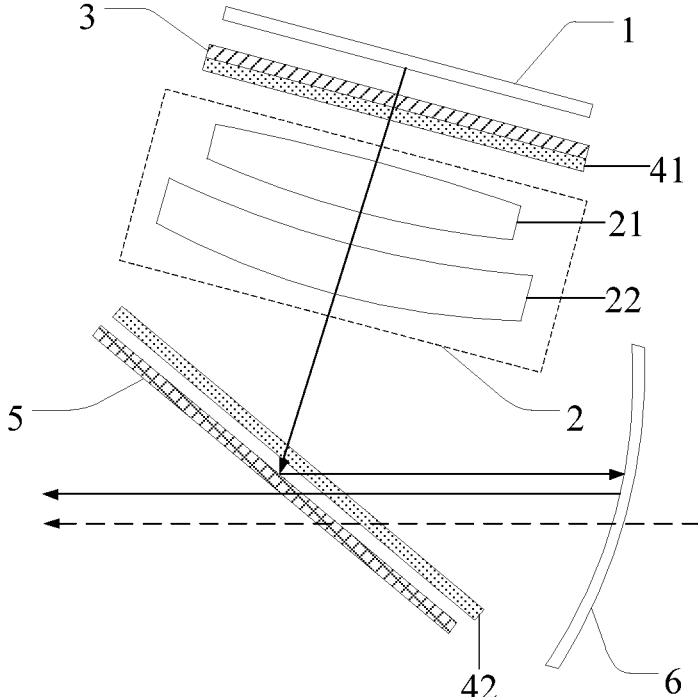
FIG. 8 is a fourth schematic diagram showing a structure of a near-eye display device according to an embodiment of the present disclosure.

FIG. 8 is a fourth schematic diagram showing a structure of a near-eye display device according to an embodiment of the present disclosure.

Referring to FIG. 8, in the present embodiment, a material of each lens of the imaging lens 2 may be an optical material such as glass or plastic. If each lens of the imaging lens 2 is made of glass, the lens generally does not have the property of changing a phase of light, such as birefringence, and the polarizer 3 may be disposed between the display device 1 and the imaging lens 2.

Taking the structure of the near-eye display device shown in FIG. 8 as an example, the first lens 21 and the second lens 22 of the imaging lens 2 are both made of glass, and the polarizer 3 is disposed between the display device 1 and the imaging lens 2. When the polarizer 3 and the first phase delay layer 41 are combined to have a composite structure, both the polarizer 3 and the first phase delay layer 41 may be disposed together between the display device 1 and the imaging lens 2.

In the near-eye display device provided by an embodiment of the present disclosure, the display device 1 may be the liquid crystal display, the light emitting diode display or the organic light emitting diode display. In general, the light outgoing surface of the display device 1 is a flat surface, such that if the polarizer 3 is disposed between the display device 1 and the imaging lens 2, the polarizer 3 may be attached to the light outgoing surface of the display device 1. If the polarizer 3 and the first phase delay layer 41 are combined to have a composite structure, both the polarizer 3 and the first phase delay layer 41 together may be attached to the light outgoing surface of the display device 1, such that a substrate for the polarizer 3 can be omitted, and the structure of the near-eye display device can be more compact.

Figure 9:
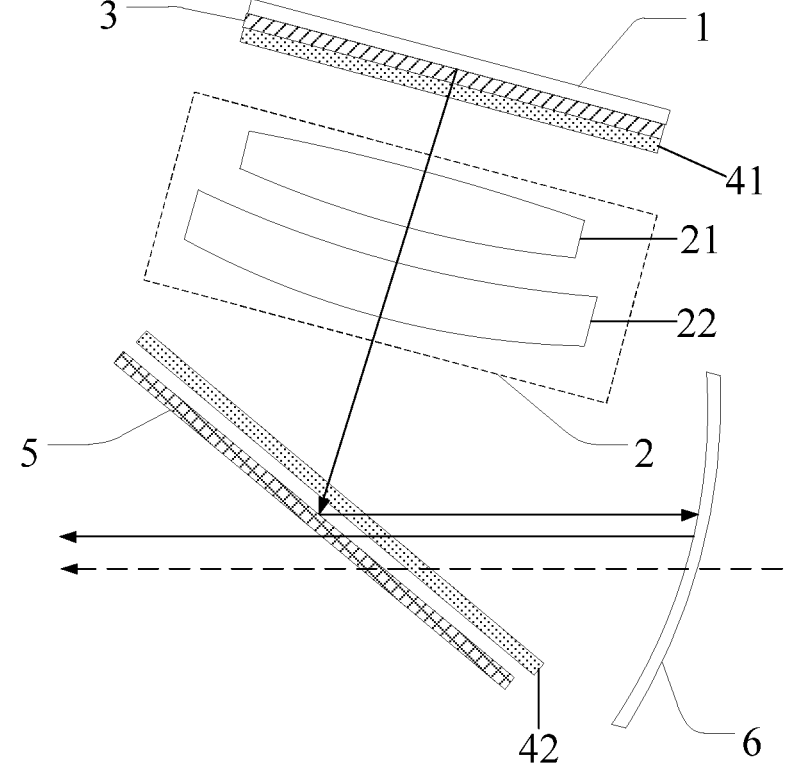
FIG. 9 is a fifth schematic diagram showing a structure of a near-eye display device according to an embodiment of the present disclosure.

FIG. 9 is a fifth schematic diagram showing a structure of a near-eye display device according to an embodiment of the present disclosure.

Referring to FIG. 9, the display device 1 may be the light emitting diode display, and the light emitted from the light emitting diode display is natural light. The polarizer 3 may be attached to the light outgoing surface of the light emitting diode display, and convert the natural light emitted from the light emitting diode display into the linearly polarized light, the polarization state of the linearly polarized light is converted by using the above-described principle, thereby implementing virtual reality display.

Alternatively, the display device 1 may be the liquid crystal display, which performs image display by using liquid crystal to modulate the linearly polarized light, such that polarizers need to be disposed on both a light incident surface and a light outgoing surface of the liquid crystal display panel. In the present embodiment, the polarizer 3 may be attached to the light outgoing surface of the liquid crystal display, such that the polarizer 3 can also serve (e.g., multiplex) as a linear polarizer layer on the light outgoing side of the liquid crystal display. In other words, if the light outgoing surface of the display device is provided with a linear polarizer layer thereon, the polarizer 3 may be omitted, but it is necessary to ensure that a polarization direction of the linear polarizer layer forms an angle of 45° with respect to the optical axis of the quarter-wave plate as the first phase delay layer 41.

Alternatively, the display device 1 may be the organic light emitting diode display or the micro organic light emitting diode display. The organic light emitting diode display or the micro organic light emitting diode display may have a circular polarizer on a light outgoing surface thereof, to resist reflection of the ambient light. The circular polarizer includes a linear polarizer layer and a phase delay layer, where the phase delay layer may be positioned to be proximal to the display device, and the linear polarizer layer may be positioned to be distal to the display device. In the present embodiment, the polarizer 3 may be attached to the light outgoing surface of the display device, such that the polarizer 3 also serves (e.g., multiplexes) as the linear polarizer layer of the circular polarizer of the display device. In other words, if the light outgoing surface of the display device is provided with the circular polarizer thereon, the polarizer 3 may be omitted, but it is necessary to ensure that a polarization direction of the linear polarizer layer of the circular polarizer forms an angle of 45° with regard to the optical axis of the quarter-wave plate as the first phase delay layer 41.

In addition, if the light emitted from the display device is the circularly polarized light, both the polarizer 3 and the first phase delay layer 41 may be omitted, and the second phase delay layer 42, the polarized light splitter 5, and other elements may be directly disposed on the light outgoing side of the display device.

In an embodiment of the present disclosure, the curved mirror 6 and the imaging lens 2 form an optical system for imaging the display device 1. The curved mirror 6 may be one of a spherical mirror, an aspheric mirror, and a free-form surface mirror. The spherical mirror has the advantages of simple design, low requirement on assembly precision, and the like. The aspheric mirror and the free-form surface mirror each have a relatively small thickness, and can optimize the imaging quality. The spherical mirror, the aspheric mirror, and free-form surface mirror may be selected according to actual requirements during optical design. A material of the curved mirror 6 may be one of glass and plastic, but is not limited herein.

The curved mirror 6 not only reflects the imaging light passing through the imaging lens 2 and the like, but also transmits the ambient light, and thus at least one of a surface of the curved mirror 6 proximal to the polarized light splitter 5 and a surface of the curved mirror 6 distal to the polarized light splitter 5 may be provided with a transflective film (i.e., a semi-transparent and semi-reflective film) thereon.

Figure 10:
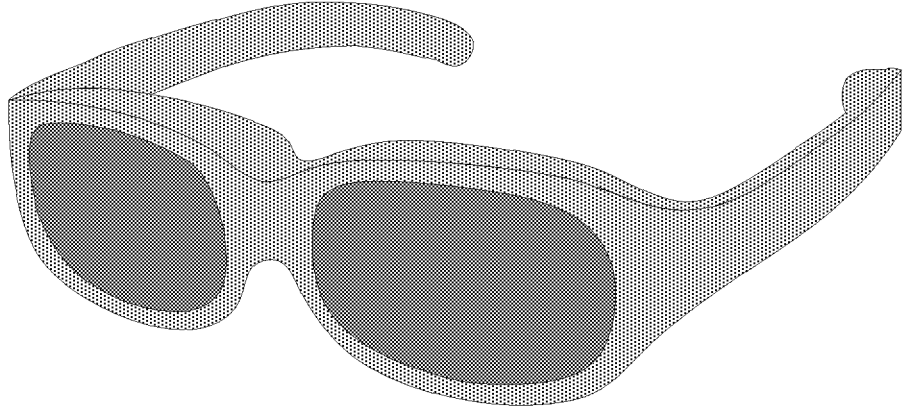
FIG. 10 is a schematic appearance diagram of a near-eye display device according to an embodiment of the present disclosure.

The near-eye display device provided by an embodiment of the present disclosure may be glasses or a helmet, and in this case, the curved mirror 6 may also serve (e.g., multiplex) as a lens of the helmet or lenses of glasses, so as to reduce the number of lenses used by the near-eye display device. In a case where the near-eye display device is a pair of glasses, an external view thereof is shown in FIG. 10.

The near-eye display device provided by an embodiment of the present disclosure includes: the display device for displaying images; the imaging lens positioned on the light outgoing side of the display device and for imaging an image displayed on the display device; the polarizer positioned on the light outgoing side of the display device and for converting the light emitted from the display device into the first linearly polarized light; the first phase delay layer positioned on the side of the polarizer distal to the display device and for converting the first linearly polarized light transmitted by the polarizer into the circularly polarized light; the polarized light splitter positioned on the side of the first phase delay layer distal to the polarizer and obliquely arranged relative to the polarizer, where the polarized light splitter can transmit the first linearly polarized light and can reflect the second linearly polarized light having a polarization direction perpendicular to a polarization direction of the first linearly polarized light; the second phase delay layer positioned on the side of the polarized light splitter proximal to the first phase delay layer and for converting the circularly polarized light transmitted by the first phase delay layer into the second linearly polarized light or partial polarized light including the second linearly polarized light, where the second linearly polarized light is reflected by the polarized light splitter, then passes through the second phase delay layer again, and is converted into the circularly polarized light or the elliptically polarized light; and the curved mirror positioned on a reflected light path of the polarized light splitter and on the side of the second phase delay layer distal to the polarized light splitter, and for partially reflecting the circularly polarized light or the elliptically polarized light which passes through the second phase delay layer again to the position where the human eyes are positioned and partially transmitting the ambient light. By adopting the structure of the near-eye display device, the polarization state of the light can be changed for many times, such that the light emitted from the display device can be used for image display, and has a high light efficiency. The polarized light splitter may completely reflect the light emitted from the display device 1 or may transmit a small part of the light emitted from the display device, such that when a user watches an image displayed on the near-eye display device under the near-eye display device, a brightness of the image displayed on the near-eye display device can be reduced to improve the effect of protection privacy. Meanwhile, the problem of ghosting (e.g., double images) generated when the light is reflected on each of two surfaces of the plate glass can be avoided by adopting the polarized light splitter.

Although preferred embodiments of the present disclosure have been described, additional variations and modifications in those embodiments may be made by those of ordinary in the art once they learn of the basic inventive concepts of the present disclosure. Therefore, it is intended that the appended claims be interpreted as including the preferred embodiments and all variations and modifications that fall within the scope of the present disclosure.

It will be apparent to one of ordinary in the art that various changes and modifications may be made to the present disclosure without departing from the spirit and scope of the present disclosure. Thus, it is intended that the present disclosure also encompass such changes and modifications if they fall within the scope of the appended claims and their equivalents.

What is claimed is:

1. A near-eye display device, comprising:
a display device configured to display an image;
an imaging lens, on a light outgoing side of the display device, and configured to image the image displayed on the display device;
a polarizer, on the light outgoing side of the display device, and configured to convert light emitted from the display device into first linearly polarized light;
a first phase delay layer, on a side of the polarizer distal to the display device, and configured to convert the first linearly polarized light transmitted by the polarizer into circularly polarized light;
a polarized light splitter, on a side of the first phase delay layer distal to the polarizer and obliquely arranged relative to the polarizer, and configured to transmit the first linearly polarized light and reflect second linearly polarized light with a polarization direction perpendicular to a polarization direction of the first linearly polarized light;
a second phase delay layer, on a side of the polarized light splitter proximal to the first phase delay layer, and configured to convert the circularly polarized light transmitted by the first phase delay layer into the second linearly polarized light or partially polarized light comprising the second linearly polarized light, wherein the second linearly polarized light is reflected by the polarized light splitter, then passes through the second phase delay layer again, and is converted by the second phase delay layer into circularly polarized light or elliptically polarized light; and
a curved mirror, on a reflected light path of the polarized light splitter and on a side of the second phase delay layer distal to the polarized light splitter, and configured to partially reflect the circularly polarized light or the elliptically polarized light converted by the second phase delay layer again to a position of a human eye and partially transmit ambient light;
wherein the polarized light splitter comprises: a substrate; and a polarized light splitting dielectric film on a surface of the substrate; and wherein the substrate comprises a first substrate part and a second substrate part, wherein the first substrate part is on a side proximal to the polarizer, and the second substrate part is on a side of the first substrate part distal to the polarizer;

opposite surfaces of the first substrate part and the second substrate part are stepped surfaces, respectively, another surface, which is opposite to the stepped surface, of each of the first substrate part and the second substrate part is a flat surface, the stepped surfaces of the first substrate part and the second substrate part are engaged with each other, and flat surfaces of the first substrate part and the second substrate are parallel to each other; and the second phase delay layer is a quarter-wave plate, the quarter-wave plate is attached to the stepped surface of the first substrate part or the second substrate part, and the polarized light splitting dielectric film is attached to the flat surface of the second substrate part.

2. The near-eye display device according to claim 1, wherein the first phase delay layer is a quarter-wave plate; and optical axes of the quarter-wave plates are parallel to each other, and an angle between a polarization direction of the polarizer and the optical axis of each of the two quarter-wave plates is 45°.

3. The near-eye display device according to claim 1, wherein the polarizer and the first phase delay layer are attached to each other.

4. The near-eye display device according to claim 1, wherein at least one of the flat surface of the first substrate part and the flat surface of the second substrate part is provided with an antireflection film.

5. The near-eye display device according to claim 1, wherein the imaging lens comprises at least one lens; and each of the at least one lens is one of a spherical lens, an aspheric lens, or a free-form surface lens.

6. The near-eye display device according to claim 5, wherein a light outgoing surface of a lens, which is farthest from the display device, of the imaging lens is a flat surface, and the polarizer is attached to the light outgoing surface.

7. The near-eye display device according to claim 5, wherein a material of each of the at least one lens is glass or plastic.

8. The near-eye display device according to claim 5, wherein the polarizer is between the display device and the imaging lens.

9. The near-eye display device according to claim 8, wherein the display device is a liquid crystal display; and the polarizer is attached to a light outgoing surface of the liquid crystal display, and the polarizer also serves as a linear polarizer layer on a light outgoing side of the liquid crystal display.

10. The near-eye display device according to claim 8, wherein the display device is an organic light emitting diode display or a micro organic light emitting diode display; and the polarizer is attached to a light outgoing surface of the display device, and also serves as a linear polarizer layer of a circular polarizer of the display device.

11. The near-eye display device according to claim 8, wherein the display device is a light emitting diode display; and the polarizer is attached to a light outgoing surface of the light emitting diode display.

12. The near-eye display device according to claim 5, wherein the imaging lens comprises a first lens and a second lens, the first lens is a positive lens and is between the display device and the second lens, and the second lens is a negative lens.

13. The near-eye display device according to claim 1, wherein the curved mirror is one of a spherical mirror, an aspheric mirror, or a free-form surface mirror.

14. The near-eye display device according to claim 13, wherein a material of the curved mirror is one of glass or plastic.

15. The near-eye display device according to claim 13, further comprising a transflective film on a surface of the curved mirror.

16. The near-eye display device according to claim 1, wherein the near-eye display device is glasses or a helmet; and the curved mirror also serves as lenses of the glasses or a lens of the helmet.

* * * * *